United States Patent [19]

Drexler et al.

[11] 4,413,036

[45] Nov. 1, 1983

[54] TWO-LAYER METAL-EFFECT COATING AND A PROCESS FOR ITS PRODUCTION

[75] Inventors: Hermann-Josef Drexler, Guntersleben; Ulrich Poth, Münster, both of Fed. Rep. of Germany

[73] Assignee: BASF Farben & Fasern A.G., Hamburg, Fed. Rep. of Germany

[21] Appl. No.: 316,405

[22] Filed: Oct. 29, 1981

[30] Foreign Application Priority Data

Nov. 5, 1980 [DE] Fed. Rep. of Germany ....... 3041648

[51] Int. Cl.$^3$ .......................... B32B 9/02; B05D 1/36; C09D 5/38
[52] U.S. Cl. .................... 428/458; 106/1.25; 106/169; 106/181; 106/193 J; 106/193 M; 427/385.5; 427/388.5; 427/404; 427/405; 427/407.1; 427/409; 428/463; 428/519; 428/520; 428/521; 428/523; 524/441; 524/599; 527/314
[58] Field of Search .................. 427/409, 388.5, 407.1, 427/401, 405; 428/463, 464, 462, 519, 458, 520, 463, 521, 522, 523; 524/599, 441; 527/314; 106/1.25, 193 J, 193 M, 169, 181

[56] References Cited

U.S. PATENT DOCUMENTS 3,169,079 2/1965 Ferington et al. .................. 427/409
3,639,147 2/1972 Benefiel et al. ..................... 427/409
4,142,018 2/1979 Ozawa et al. ....................... 427/409
4,226,901 10/1980 Siguira et al. ...................... 427/409
4,324,708 4/1982 Ito et al. .............................. 427/409

OTHER PUBLICATIONS

Chemical Abstracts, vol. 74, p. 127688p.

*Primary Examiner*—Norman Morgenstern
*Assistant Examiner*—Janyce A. Bell
*Attorney, Agent, or Firm*—Wells & Wells

[57] ABSTRACT

A two-layer metal-effect coating, composed of a base layer which contains metal pigments and of a clear top coating, at least the base layer being obtained from a coating agent which contains as the film-forming binder a polymer resin which was obtained by copolymerizing olefinically unsaturated compounds, wherein the polymer resin is obtained by copolymerizing (a) 1.0 to 50.0% by weight of acrylonitrile, methacrylonitrile or a mixture thereof
(b) 0.1 to 10.0% by weight of a compound having 2 or more polymerizable olefinic double bonds;
(c) 40.0 to 98.9% by weight of other copolymerizable compounds, and
(d) up to 5% by weight cellulose ester; with the total amount of the components a, b, c and d being 100% by weight.

28 Claims, No Drawings

TWO-LAYER METAL-EFFECT COATING AND A PROCESS FOR ITS PRODUCTION

The invention relates to a two-layer metal-effect coating, composed of a base layer which contains metal pigments and of a clear top coating, at least the base layer being obtained from a coating agent which contains as the film-forming binder a polymer resin which was obtained by copolymerizing olefinically unsaturated compounds, and a process for its production.

German Published Specification No. 1,949,372 which corresponds to U.S. patent application Ser. No. 763,972, filed Sept. 30, 1968, and now abandoned, discloses a two-layer metal-effect coating in which the base layer contains a proportion of cellulose esters, which is plasticized by a linear or branched saturated polyester or by an acrylate resin containing hydroxyl groups and, if appropriate, also carboxyl groups. A further proportion of an amino resin causes crosslinking to take place during the stoving process. The base layer also contains the metal particles, preferably aluminum particles, which create the metal effect, and, if appropriate, a coloring pigment.

The clear top coating is composed of alkyd resins, saturated polyesters or polyacrylate resins which contain hydroxyl groups, or mixtures thereof, which are crosslinked with amino resins, preferably melamine resins.

This known two-layer metal-effect coating is distinguished by its very high metal effect, which is caused by the particular way in which the aluminum particles are oriented. The coating also exhibits good mechanical properties and a high weathering resistance.

The usual method of producing a two-layer metal-effect coating is that the base coating containing the metal pigments is applied to a substrate and the clear top coating is then applied wet-on-wet. The base layer and the clear top coating are then stoved together.

As disclosed in German Published Specification No. 1,949,372 and U.S. patent application Ser. No. 763,972, "steel is the preferred substrate but other substrates can be used which are not adversely affected by baking operations including glass, ceramics, asbestos, wood and plastics and metals such as aluminum, copper, magnesium and alloys thereof."

The base layer and the clear top coating are usually applied by spraying. The base layer disclosed in German Published Specification No. 1,949,372, and U.S. patent application Ser. No. 763,972, when suitable for processing, that is to say when it has a flow time of 14–18 seconds in the DIN cup 4 (DIN 53 211), has a disadvantageously low solids content of 10–15% by weight. Correspondingly, the base layer gives off a large amount of organic solvent. For economic reasons and in order to protect the environment, efforts are being undertaken to increase considerably the solids content of base coatings used in two-layer metal-effect coatings and the lower the emission of organic solvents thereby. These efforts have hitherto not been successful since increasing the solids content has always been associated with a considerable deterioration of the metal effect of the coating.

The object of the invention is to avoid these disadvantages of the prior art and to provide a two-layer metal-effect coating which, on the one hand, exhibits the desired orientation of the metal pigments in the base layer, and hence an outstanding metal effect, and during whose production, on the other hand, a suitably reduced emission of organic solvents occurs owing to an increase in the solids content. The two-layer metal-effect coating is intended still to have good mechanical properties and a high weathering resistance.

For a two-layer metal-effect coating of the type mentioned initially this object is achieved according to the invention by obtaining the polymer resin by copolymerizing
  (a) 1.0 to 50.0% by weight of acrylonitrile, methacrylonitrile or mixture thereof,
  (b) 0.1 to 10.0% by weight of a compound having 2 or more polymerizable olefinic double bonds and
  (c) 40.0 to 98.9% by weight of other copolymerizable compounds, with the total amount of the components a, b and c being 100% by weight.

An advantageous embodiment of the invention comprises obtaining the polymer resin by copolymerizing
  (a) 3.0 to 30.0% by weight of acrylonitrile, methacrylonitrile or mixture thereof,
  (b) 1.0 to 7.0% by weight of a compound having 2 or more polymerizable olefinic double bonds and
  (c) 63.0 to 96.0% by weight of other copolymerizable compounds, with the total amount of the components a, b and c being 100% by weight.

Examples of the component b are divinylbenzene, glycol divinyl ether, divinyl adipate, allyl vinyl ether, diallyl fumarate, triallyl cyanurate and similar compounds. Lower molecular prepolymers of these compounds can also be used.

Diacrylates, triacrylates or tetraacrylates of 2-, 3- or 4-hydric alcohols are particularly advantageously used as component b. Examples of such polyfunctional acrylate monomers and methacrylate monomers are ethylene glycol diacrylate, 2-ethylpropane-1,3-diol diacrylate, butane-1,3-diol diacrylate, butane-1,4-diol diacrylate, neopentyl glycol diacrylate, 3-methylpentanediol diacrylate, hexane-1,6-diol diacrylate, diethylene glycol diacrylate, triethylene glycol diacrylate, tetraethylene glycol diacrylate, tripropylene glycol diacrylate, polyethylene glycol 200 diacrylate, polyethylene glycol 400 diacrylate, diacrylates of bisphenol A derivates, the diacrylate of ethoxylated bisphenol A, diacrylates of amides, trimethylolpropane triacrylate, tetraoxethylated trimethylol propane triacrylate, pentaerythritol triacrylate, melamine triacrylate, the triacrylate of (tris-2-hydroxyethyl)-isocyanurate, pentaerythritol tetraacrylate, ethylene glycol dimethacrylate, butane-1,3-diol dimethacrylate, butane-1,4-diol dimethacrylate, neopentyl glycol dimethacrylate, hexane-1,6-diol dimethacrylate, diethylene glycol dimethacrylate, triethylene glycol dimethacrylate, tetraethylene glycol dimethacrylate, polyethylene glycol dimethacrylate, polyethylene glycol 600 dimethacrylate, the dimethacrylate of ethoxylated bisphenol A, trimethylolethane trimethacrylate, trimethylolpropane trimethacrylate and the trimethacrylate of (tris-2-hydroxyethyl)-isocyanurate.

Compounds are preferably used as component c which are selected from the following group: acrylic acid, methacrylic acid, crotonic acid, esters of these acids, amides of these acids and their methylol derivatives, styrene and other compounds containing vinyl groups. Lower-molecular prepolymers of these monomers can also be used in this case.

Examples of suitable monomers are methyl acrylate, ethyl acrylate, n-propyl acrylate, isopropyl acrylate, n-butyl acrylate, isobutyl acrylate, tert.-butyl acrylate, n-pentyl acrylate, neopentyl acrylate, n-hexyl acrylate cyclohexyl acrylate, n-octyl acrylate, 2-ethylhexyl acrylate, 2-hydroxyethyl acrylate, hydroxypropyl acrylate, 2-methoxyethyl acrylate and dimethylaminoethyl acrylate and the corresponding methacrylates. Further suitable monomers are acrylamide, methacrylamide, N-methylacrylamide, N-methylmethacrylamide N-methylolacrylamide and N-methylolmethacrylamide. Vinyltoluene, α-methylstyrene, vinyl acetate and similar compounds are also suitable monomers for the copolymerization.

The coating agent for the base layer contains advantageously, in addition to the components a, b and c, up to 5% by weight of a cellulose ester as component d, with the total amount of the components a, b, c and d being 100% by weight. Examples of this coating agent are cellulose nitrate, cellulose acetate, cellulose propionate, cellulose butyrate, cellulose acetopropionate and mixtures thereof. Cellulose acetobutyrate is particularly preferred.

Advantageously, the polymer resin contains crosslinkable hydroxyl groups and the coating agent for the base layer also contains a crosslinking agent which crosslinks the hydroxyl groups. The crosslinking agent can be an aminoplast resin, a blocked polyisocyanate and/or a phenoplast resin.

Urea and its substitution products, and, further, aminotriazines which contain at least 2 amino groups, such as melamine and ammeline, and thioammeline and benzoguanamine are used as compounds which form aminoplast resins.

The aminoplast resins are prepared by condensation with an aldehyde. The most frequently used aldehyde is formaldehyde. The resulting condensation products have methylol groups. Some of these can be etherified with a monohydric and/or polyhydric alcohol. Examples of suitable alcohols are methanol, ethanol, propanol, isopropanol, butanol, allyl alcohol, glycol, diglycol, polyglycol, glycerol, pentaerythritol, sorbitol or mannitol.

Any less polyisocyanate in which the isocyanate groups have been reacted with a compound in such a manner that the blocked polyisocyanate formed is stable towards hydroxyl groups or amino groups at room temperature, but that it reacts with these groups at elevated temperatures, can be used as the blocked polyisocyanate. Examples of suitable polyisocyanates are diisocyanates, such as toluylene diisocyanates, xylylene diisocyanates, trimethylene diisocyanate, tetramethylene diisocyanate, hexamethylene diisocyanate or diphenylmethane diisocyanate and its completely or partially hydrogenated reaction products with alcohols, polyols or polyether polyols, 1,4-cyclohexane diisocyanate, 1,2-cyclohexane diisocyanate, m-phenylene diisocyanate, 1,4-naphthalene diisocyanate, and 4,4-diphenylenemethane diisocyanate. Suitable blocking agents are aliphatic, cycloaliphatic or alkylaromatic alcohols or phenol compounds, which can be straight-chain, branched or ring-like, such as, for example, methanol, ethanol, n-butanol, isobutanol, tert.-butanol, hexanol, ethylhexanol, nonyl alcohol, furfuryl alcohol, phenylcarbinol, cyclohexanol, alkyl glycols, alkyl diglycols and alkyl triglycols. However, other known blocking agents, such as lactams, ketoximes, acetoacetates, or malonates, and also phenol compounds, such as phenol itself and substituted phenols whose substituents do not affect the coating disadvantageously, such as cresol and xylenol, can also be used. If desired, small amounts of higher-molecular monoalcohols of relatively low volatility, which serve as plasticizers in the coatings, can also be used. Further blocking agents are tertiary hydroxylamines, such as diethylethanolamine and oximes, such as methyl ethyl ketone oxime, acetone oxime and cyclohexanone oxime. The use of oximes and phenols is particularly advantageous, since certain polyisocyanates which have been blocked with these blocking agents become free again at a relatively low temperature without a catalyst for the urethane formation, such as, for example, a tin catalyst, having to be added.

The addition product from the organic polyisocyanate and the blocking agent is formed by reacting a sufficient amount of the blocking agent with the organic polyisocyanate and making sure that no free isocyanate groups remain.

The blocked isocyanate groups are stable towards amino groups and in particular towards hydroxyl groups at room temperature and also at a slightly elevated temperature, and they only react at temperatures above 100° C.

Phenoplast resins are understood as meaning condensation products from, on the one hand, phenol and its homologs, such as cresols, xylenols and also alkylphenols, such as, for example, p-tert.-butylphenol, and, on the other hand, formaldehyde.

The invention further relates to a process for the production of a two-layer metal-effect coating, composed of a base layer and a clear top coating, by application of a coating agent which contains metal pigments and of a clear coating, and by subsequent stoving.

The process comprises copolymerizing the structural building blocks
(a) 1.0 to 50.0% by weight of acrylonitrile and/or methacrylonitrile or mixture thereof,
(b) 0.1 to 10.0% by weight of a compound having 2 or more polymerizable olefinic double bonds and
(c) 40.0 to 98.9% by weight of other copolymerizable compounds, with the total amount of the components a, b and c being 100% by weight, in order to prepare the binder for the coating agent for the base layer, and processing the polymer resin thus obtained together with metal pigments, organic solvents and, if appropriate, coloring pigments and known auxiliary agents into a coating agent by dispersing.

In the event that the polymer resin contains crosslinkable hydroxyl groups, a polyisocyanate can be advantageously admixed to the coating agent for the base layer, prior to or during application. In this case, the coating agent for the base layer constitutes a so-called two-component material.

Advantageously, the coating agent for the base layer is first applied and the clear top coating thereafter wet-on-wet, and the two layers are stoved together.

Further advantageous embodiments of the process according to the invention are specified in subclaims 11 to 18.

The invention further relates to the use of a metal pigment-containing coating agent, which contains as the film-forming binder a polymer resin which was obtained by copolymerizing olefinically unsaturated compounds, for the base layer of a two-layer metal-effect coating which has a clear top coating as the top finish. The use according to the invention comprises obtaining the polymer resin by copolymerizing
(a) 1.0 to 50.0% by weight of acrylonitrile, methacrylonitrile or mixture thereof, (b) 0.1 to 10.0% by weight of a compound having 2 or more polymerizable olefinic double bonds and
(c) 40.0 to 98.9% by weight of other copolymerizable compounds, with the total amount of the components a, b and c being 100% by weight.

A coating for the base layer of a two-layer metal-effect coating is prepared by using the binders described together with a metal pigment and, if appropriate, coloring pigments, and organic solvents and customary auxiliary substances, such as, for example, fillers, agents for improving flow and viscosity-controlling agents, by the processes known in the paint industry and by means of the known apparatuses. Every clear coating which is customarily used in two-layer metal-effect coatings, for example in the original coating with stoving temperatures of between 100° and 150° C., in refinishing coatings between 60° and 110° C. and in refinishing coatings which dry at room temperature is suitable as material for the clear top coating, ie. the base coating according to the invention is suitable for all drying temperatures customarily used for two-layer metal-effect coatings. The invention does not relate to these clear coatings and therefore they need not be explained in greater detail.

It has now been found that the base coatings used in the production of the two-layer metal-effect coating according to the invention have during processing, ie. when the runoff time in the DIN cup 4 (DIN 53 211) is 14-18 seconds, a binder content of 22-35% by weight. By comparison with the hitherto employed base coatings of a solids content of 8-15%, this denotes a considerable reduction of the content of organic solvents, which are emitted during spraying, in the evaporation zone and during stoving. For example, during the production of a base layer of 10-15 μm dry-film thickness only about 50% of the amount of organic solvents liberated in the systems processed hitherto is still emitted. The two-layer metal-effect coating according to the invention continues to exhibit an outstanding metal effect.

Below, the invention is explained in more detail by means of examples.

EXAMPLE 1

Preparation of an Acrylate Resin for use as a Binder for the Base Layer of a Two-layer Metal-effect Coating 428 g of xylene and 118 g of n-butanol are weighed into a 2-liter round-bottomed 4-necked flask equipped with a stirrer, a thermometer, a nitrogen inlet tube, electrical resistance heating, a reflux condenser and 2 tap funnels, and the mixture is heated to the refluxing temperature. 212 g of methyl methacrylate, 209 g of n-butyl methacrylate, 59 g of acrylonitrile, 88 g of 2-hydroxypropyl acrylate, 12 g of hexane-1,6-diol diacrylate and 9 g of acrylic acid are weighed into the first tap funnel and mixed. 21 g of t-butyl perbenzoate (dissolved in 44 g of xylene) are fed into the second tap funnel. The contents of the two tap funnels are metered in simultaneously and at a uniform rate in the course of 4 hours and while maintaining the reflux temperature. The reflux temperature is then maintained for a further hour. A polymeric solution results which has a solids content of 50% and an acid number of 12. A viscosity determination on a solution diluted to 40% by weight with butanol, by means of an ICI viscometer (of the disc/cone type), gave a viscosity of 270 mPas.

EXAMPLE 2

Preparation of an Acrylate Resin for use as a Binder for the Base Layer of a Two-layer Metal-effect Coating The procedure of Example 1 was followed and the same apparatus as there was used to prepare a further resin. 530 g of butyl acetate were introduced initially. The tap funnel 1 contained: 178 g of methyl methacrylate, 178 g of n-butyl methacrylate, 116 g of ethyl acrylate, 41 g of acrylonitrile, 47 g of 2-hydroxyethyl acrylate, 18 g of 2,2-dimethylpropane-1,3-diol dimethacrylate and 15 g of methacrylic acid. The tap funnel 2 contained a suspension of 15 g of azoisobutyric acid dinitrile in 63 g of butyl acetate. A polymer solution of 50% solids content resulted. The acid number was 10 and the viscosity of a 40% strength solution in butyl acetate was 300 mPas.

EXAMPLE 3

Preparation of an Acrylate Resin for use as a Binder for the Base Layer of a Two-layer Metal-effect Coating A further resin was prepared in the same apparatus as in Examples 1 and 2, following the same procedure.

437 g of butyl acetate, 117 g of n-butanol and 6 g of tert.-dodecylmercaptan were introduced initially. The tap funnel 1 contained 84 g of methyl methacrylate, 233 g of n-butyl methacrylate, 58 g of styrene, 87 g of methacrylonitrile, 105 g of 2-hydroxypropyl methacrylate, 9 g of trimethylolpropane triacrylate and 6 g of acrylic acid. The tap funnel 2 contained 23 g of tert.-butyl perbenzoate in 29 g of n-butyl acetate.

EXAMPLE 4

Preparation of a Base Coating 150 g of a 6% strength dispersion of a modified polyethylene wax in butyl acetate were introduced initially. 300 g of a solution of the acrylate resin from Example 1, 240 g of a solution of a partially butanol-etherified medium reactive melamine resin (50% strength in n-butanol), 2 g of a 10% strength solution of a polyphenylmethylsiloxane in xylene, 25 g of n-butylglycol acetate, 30 g of ethylglycol acetate and 80 g of n-butyl acetate were added with stirring. 75 g of a 66% strength paste of a surface-treated aluminum powder in a high-boiling aliphatic solvent were suspended in 98 g of butyl acetate by thorough agitation and added to the above-mentioned mixture. A metal-effect base coating having a 34% solids content and a runoff time of 30 seconds in the DIN cup 4 resulted. This base coating was given a suitable processing consistency with 300 g of a solvent mixture of 80 parts of xylene and 20 parts of n-butyl acetate. It then had a solids content of 26% by weight.

EXAMPLES 5 AND 6

Preparation of Further Base Coatings

Base coatings were prepared in the same manner as in Example 4, using solutions of the acrylate resins from Examples 2 and 3.

EXAMPLE 7

Preparation of a Color-pigmented Base Coating 230 g of an acrylate solution in accordance with Example 1, 18 g of phthalocyanine blue and 2 g of lampblack were porcelain ball-milled to a fineness of grind of 5 μm (grindometer). 160 g of a 6% strength dispersion of a polyethylene copolymer wax in n-butyl acetate, 130 g of an acrylate solution in accordance with Example 1, 236 g of a 55% strength solution of a partially butanol-etherified, medium reactive melamine-formaldehyde resin in n-butanol, 2 g of a 10% strength solution of a polymethylphenylsiloxane, 75 g of xylene and 117 g of n-butyl acetate were then added successively with stirring. 15 g of a 66% strength aluminum paste in an aliphatic dispersing agent were then suspended in 15 g of n-butyl acetate. This suspension was added to the above mixture and the resulting mixture was stirred. When the preparation of the base coating was complete it had a solids content of 33% by weight, and it was brought into a state suitable for processing by adjusting its runoff time in the DIN cup 4 to 15 seconds for a solids content of 27% by weight, with a mixture of 80 parts of butyl acetate and 20 parts of butanol.

EXAMPLE 8

Preparation of a Further Base Coating 150 g of a 6% strength dispersion of a modified polyethylene wax in butyl acetate were introduced initially. 280 g of a solution of the acrylate resin of Example 1, 45 g of a 15% strength solution of a cellulose ester of 50% butyrate and 3% acetate in butyl acetate, 240 g of a solution of a partially butanol-etherified medium reactive melamine resin (50% strength in n-butanol), 2 g of a 10% solution of a polyphenylmethylsiloxane in xylene, 25 g of n-butylglycol acetate, 30 g of ethylglycol acetate and 55 g of n-butyl acetate were added with stirring. 75 g of a 66% strength paste of a surface-treated aluminum powder in a high-boiling aliphatic solvent were suspended in 98 g of butyl acetate with thorough agitation, and the suspension was added to the abovementioned mixture. A metal-effect base coating having a 33.7% solids content and a runoff time of 24 seconds in the DIN cup 4 resulted. This base coating was adjusted to a runoff time in the DIN cup 4 of 15.5 seconds, with a solvent mixture of 20 parts of n-butanol and 80 parts of n-butyl acetate. It then had a solids content of 26.5% by weight.

EXAMPLE 9

Preparation of a Clear Coating 941 g of an aromatic mixture with a boiling range of 156° C.–172° C. were introduced initially and heated to 140° C. A mixture of 223 g of styrene, 223 g of methyl methacrylate, 208 g of butane-1,4-diol monoacrylate, 30 g of acrylic acid, 803 g of n-butyl acrylate and 18 g of di-tert.-butyl peroxide was added at a uniform rate in the course of 3 hours at 140° C. The reaction mixture was maintained at 140° C. for a further 30 minutes, and a solution of 4 g of di-tert.-butyl peroxide in 50 g of the aromatic mixture with a boiling range between 156°–172° C. was then added. An acrylate resin solution with a 60.3% solids content resulted after a further 2 hours at 140° C. The resin had an acid number of 14, an OH number of 109 and a viscosity of 250 mPas (measured on a 50% strength solution in xylene by means of the ICI viscometer).

A melamine-formaldehyde condensate resin was prepared according to a known process by adjusting the pH of a mixture of 630 parts of melamine and 2435 parts of an aqueous formaldehyde solution (with 40% by volume of formaldehyde) in sodium hydroxide solution to 7.0 and heating the mixture at 90° C., until the resin was precipitated when a sample of the mixture was diluted with sufficient water to double the volume. 1300 parts of water were then distilled off in vacuo and 4000 parts of n-butanol and 500 parts of concentrated hydrochloric acid were added. After the mixture had been maintained at 40° C. for 30 minutes, the etherified product was neutralized with 250 g of sodium carbonate. After the butanol-containing layer had been separated off, water was removed in vacuo and the remainder was adjusted to a solids content of 60% by distilling off solvent.

A clear coating was prepared from 50 parts of the acrylate resin solution and 30 parts of the melamine resin solution together with 15 parts of xylene and 5 parts of butyl acetate.

EXAMPLES 10 TO 14

Production of Two-layer Metal-effect Coatings

In order to produce the coatings steel sheets were pretreated by being first passivated by an iron phosphatizing, then primed with a customary electrocoating lacquer and stoved and thereafter coated with a customary stoving filler and stoved again.

These sheets thus pretreated were each coated with one of the base coatings of Examples 4 to 8. The base coatings were sprayed onto the sheets by means of a spray gun with a 1.2 mm nozzle width and a pressure of 4 bar. After air-drying for 5 minutes the base layers were oversprayed wet-on-wet with the clear coating in accordance with Example 9. After air-drying for 15 minutes the panels were stoved for 30 minutes at 130° C. During stoving the binder components crosslink and two-layer metal-effect coatings were obtained which had an outstanding metal effect.

We claim:

1. In an article having a substrate and a two-layer metal-effect coating adhered thereto, said coating comprising a base layer which contains metal pigments and a clear top coating, the improvement comprising at least said base layer obtained from a coating composition containing as a film-forming binder a polymer resin obtained by a copolymerizing olefinically unsaturated compounds wherein said polymer resin is a copolymerization product of:
    (a) 1.0 to 50.0% by weight of acrylonitrile, methacrylonitrile, or a mixture thereof;
    (b) 0.1 to 10.0% by weight of a compound having 2 or more polymerizable olefinic double bonds; and
    (c) 40.0 to 98.9% by weight of other copolymerizable compounds; and admixed to the composition
    (d) up to 5% by weight cellulose ester, with the total amount of the components (a), (b), (c), and (d) being 100% by weight.

2. The article of claim 1, wherein said clear top coat is obtained from a second coating composition selected from the group consisting of alkyd resins, saturated polyesters, polyacrylate resins which contain hydroxyl groups, or mixtures thereof which are cross-linked with amino acids.

3. The article of claim 2, wherein said polymer resin is a copolymerization product of:
    (a) 3.0 to 30.0% by weight of acrylonitrile, methacrylonitrile, or mixtures thereof;
    (b) 1.0 to 7.0% by weight of a compound having 2 or more polymerizable olefinic double bonds; and
    (c) 63.0 to 96.0% by weight of other copolymerizable compounds, with the total amount of the components (a), (b), and (c) being 100% by weight.

4. The article of claim 3, wherein component (b) is selected from the group consisting of diacrylates, triacrylates and tetraacrylates of 2-, 3-, and 4-hydric alcohols.

5. The article of claim 4, wherein component (c) is selected from the group consisting of acrylic acid, methacrylic acid, crotonic acid, esters of these acids, amides of these acids and their methylol derivatives, styrene and other compounds containing vinyl groups.

6. The article of claim 2, wherein said cellulose ester is cellulose acetobutyrate.

7. The article of claim 2, wherein said polymer resin contains cross-linkable hydroxyl groups.

8. The article of claim 7, wherein said coating composition also contains a cross-linking agent which cross-links the hydroxyl groups.

9. The article of claim 8, wherein said cross-linking agent is selected from the group consisting of an aminoplast resin, a blocked polyisocyanate, a phenoplast resin, and mixtures thereof.

10. In a process for the production of an article having a substrate and a two-layer metal-effect coating adhered thereto comprising applying to said substrate a first coating composition containing metal pigments and a second clear coating composition over said first coating composition and stoving to produce said article, the improvement comprising said first coating composition prepared by copolymerizing:
(a) 1.0 to 50.0% by weight of acrylonitrile, methacrylonitrile, or a mixture thereof;
(b) 0.1 to 10.0% by weight of a compound having 2 or more polymerizable olefinic double bonds; and
(c) 40.0 to 98.9% by weight of other copolymerizable compounds; and admixed to the composition
(d) up to 5% by weight cellulose ester; with the total amount of the components (a), (b), (c), and (d) being 100% by weight;
and dispersing a polymer resin thus obtained together with metal pigments and organic solvents.

11. The process of claim 10, wherein said second coating composition is selected from the group consisting of alkyd resins, saturated polyesters, polyacrylate resins which contain hydroxyl groups, or mixtures thereof which are cross-linked with amino acids.

12. The process of claim 11, wherein said first coating composition is prepared by copolymerizing;
(a) 3.0 to 30.0% by weight of acrylonitrile, methacrylonitrile, or a mixture thereof;
(b) 1.0 to 7.0% by weight of a compound having 2 or more polymerizable olefinic double bonds; and
(c) 63.0 to 96.0% by weight of other copolymerizable compounds, with the total amount of the components (a), (b), and (c) being 100% by weight.

13. The process of claim 12, wherein component (b) is selected from the group consisting of diacrylates, triacrylates and tetraacrylates of 2-, 3-, and 4-hydric alcohols.

14. The process of claim 13, wherein component (c) is selected from the group consisting of acrylic acid, methacrylic acid, crotonic acid, esters of these acids, amides of these acids and their methylol derivatives, styrene and other compounds containing vinyl groups.

15. The process of claim 11, wherein said cellulose ester is cellulose acetobutyrate.

16. The process of claim 15, wherein a copolymerization product of components (a), (b), (c), and (d) contains cross-linkable hydroxyl groups.

17. The process of claim 16, wherein said first coating composition also contains a cross-linking agent which cross-links the hydroxyl groups.

18. The process of claim 17, wherein said cross-linking agent is an aminoplast resin, a blocked polyisocyanate, a phenoplast resin or a mixture thereof.

19. The process of claim 18, further comprising adding a polyisocyanate to said first coating composition.

20. The process of claim 11, wherein said second coating composition is applied wet-on-wet to said first coating composition and both compositions are stoved simultaneously.

21. In a coating composition containing as the film-forming binder a polymer resin which was obtained by copolymerizing olefinically unsaturated compounds, for the base layer on a substrate of a two-layer metal-effect coating which has a clear top coating as the top finish, wherein said polymer resin is a copolymerization product of:
(a) 1.0 to 50.0% by weight of acrylonitrile, methacrylonitrile, or a mixture thereof;
(b) 0.1 to 10.0% by weight of a compound having 2 or more polymerizable olefinic double bonds; and
(c) 40.0 to 98.9% by weight of other copolymerizable compounds; and admixed to the composition
(d) up to 5% by weight cellulose ester;
with the total amount of the components (a), (b), (c), and (d) being 100% by weight.

22. The composition of claim 21, wherein said polymer resin is a copolymerization product of:
(a) 3.0 to 30.0% by weight of acrylonitrile, methacrylonitrile, or a mixture thereof;
(b) 1.0 to 7.0% by weight of a compound having 2 or more polymerizable olefinic double bonds; and
(c) 63.0 to 96.0% by weight of other copolymerizable compounds, with the total amount of the components (a), (b), and (c) being 100% by weight.

23. The composition of claim 22, wherein component (b) is selected from the group consisting of diacrylates, triacrylates and tetraacrylates of 2-, 3-, and 4-hydric alcohols.

24. The composition of claim 23, wherein component (c) is selected from the group consisting of acrylic acid, methacrylic acid, crotonic acid, esters of these acids, amides of these acids and their methylol derivatives, styrene and other compounds containing vinyl groups.

25. The composition of claim 21, wherein said cellulose ester is cellulose acetobutyrate.

26. The composition of claim 25, wherein said polymer resin contains cross-linkable hydroxyl groups.

27. The composition of claim 26, wherein said composition also contains a cross-linking agent which cross-links said hydroxyl groups.

28. The composition of claim 27, wherein said cross-linking agent is selected from the group consisting of an aminoplast resin, a blocked polyisocyanate, a phenoplast resin, and mixtures thereof.

* * * * *